(12) United States Patent
O'Connor

(10) Patent No.: US 10,042,484 B1
(45) Date of Patent: Aug. 7, 2018

(54) COUPLING CORRECTION IN CAPACITIVE TOUCH PANELS

(71) Applicant: Apple Inc., Cupertino, CA (US)

(72) Inventor: Sean E. O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 764 days.

(21) Appl. No.: 14/474,571

(22) Filed: Sep. 2, 2014

(51) Int. Cl.
*G06F 3/044* (2006.01)

(52) U.S. Cl.
CPC .... *G06F 3/044* (2013.01); *G06F 2203/04104* (2013.01)

(58) Field of Classification Search
CPC . G06F 3/04; G06F 3/0418; G06F 2203/04104
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2006/0197753 A1 | 9/2006 | Hotelling | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Mark Edwards
(74) *Attorney, Agent, or Firm* — Morrison and Foerster LLP

(57) ABSTRACT

A touch screen is disclosed. In some examples, the touch screen comprises a touch sensor panel including a plurality of touch pixels that include a first and a second touch pixel, a first sense connection coupled to the first touch pixel, and a second sense connection coupled to the second touch pixel. In some examples, a touch controller is configured to detect an object coupled to the first touch pixel and the second sense connection, and in response to detecting the object, output substantially no touch signal associated with the second touch pixel. In some examples, the touch controller is further configured to scale a first touch signal associated with the first touch pixel by a first correction coefficient corresponding to the first touch pixel and the second touch pixel, and subtract the scaled first touch signal from a second touch signal associated with the second touch pixel.

21 Claims, 10 Drawing Sheets

(56) References Cited

U.S. PATENT DOCUMENTS

2014/0192027 A1* 7/2014 Ksondzyk .............. G01N 27/22
              345/178
2015/0378482 A1* 12/2015 Portmann ............... G06F 3/044
              345/174

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

COUPLING CORRECTION IN CAPACITIVE TOUCH PANELS

FIELD OF THE DISCLOSURE

This relates generally to touch sensor panels, and more particularly to correcting for false touch signals detected on the touch sensor panels.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). The layout of the transparent conductive plates (e.g., touch pixels, or touch electrodes), as well as other touch screen components (e.g., traces or sense connections, bond pads, etc.) on the touch screen can result in false touch signals being detected on the touch screen. For example, a finger or object touching or in proximity to the touch screen can couple to sense connections or bond pads on the touch screen, and can make it appear as if touch activity is occurring at the touch pixels to which the sense connections or bond pads are coupled. The examples of the disclosure provide various techniques for correcting for such false touch signals detected on a touch screen. In some examples, correction values are subtracted from touch signals to reduce the effects of false touch signals. In some examples, the touch signals are corrected only if a touch exceeds a predefined threshold of touch.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). The layout of the transparent conductive plates (e.g., touch pixels, or touch electrodes), as well as other touch screen components (e.g., traces or sense connections, bond pads, etc.) on the touch screen can result in false touch signals being detected on the touch screen. For example, a finger or object touching or in proximity to the touch screen can couple to sense connections or bond pads on the touch screen, and can make it appear as if touch activity is occurring at the touch pixels to which the sense connections or bond pads are coupled. The examples of the disclosure provide various techniques for correcting for such false touch signals detected on a touch screen. In some examples, correction values are subtracted from touch signals to reduce the effects of false touch signals. In some examples, the touch signals are corrected only if a touch exceeds a predefined threshold of touch.

Figure 1A:
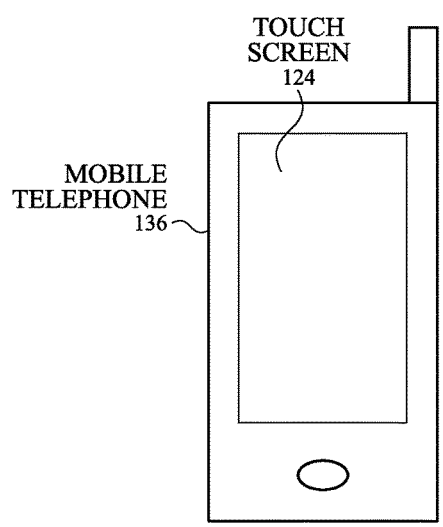
FIGS. 1A-1D illustrate an example mobile telephone, an example media player, an example personal computer and an example tablet computer that can each include an exemplary touch screen according to examples of the disclosure.
Figure 1B:
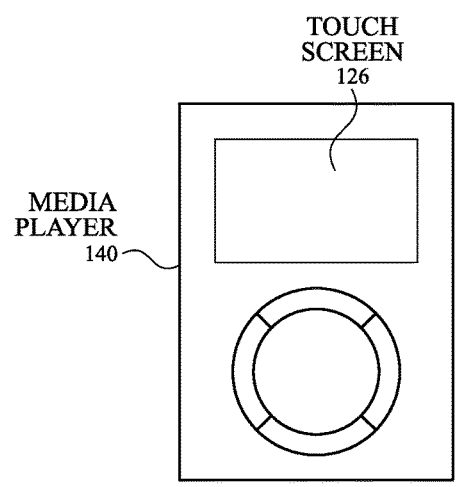
Figure 1C:
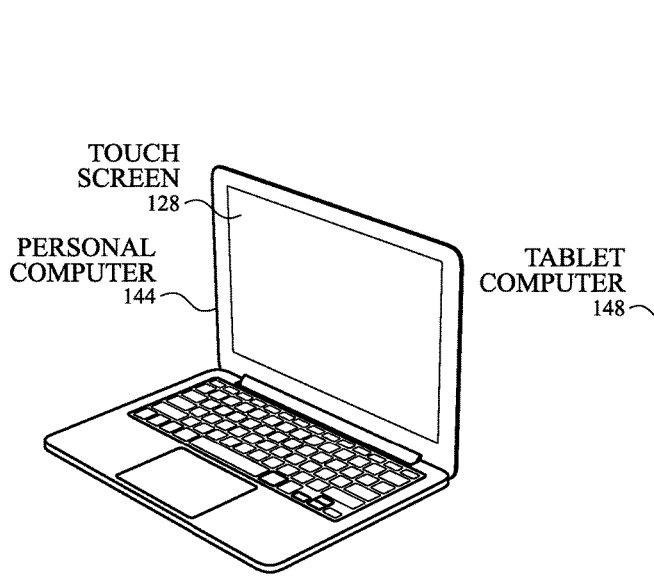
Figure 1D:
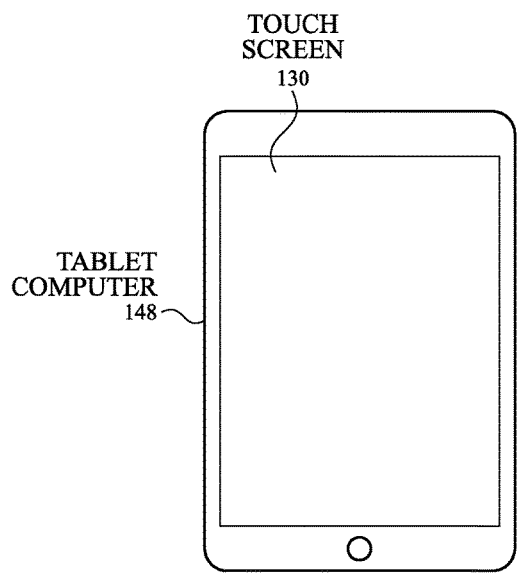

FIGS. 1A-1D show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small plates of conductive material that can be referred to as a touch pixel or a touch pixel electrode. For example, a touch screen can include a plurality of touch pixels, each touch pixel corresponding to a particular location on the touch screen at which touch or proximity (i.e., a touch or proximity event) is to be sensed. Such a touch screen can be referred to as a pixelated self-capacitance touch screen. During operation, the touch pixel can be stimulated with an AC waveform, and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen.

Figure 2:
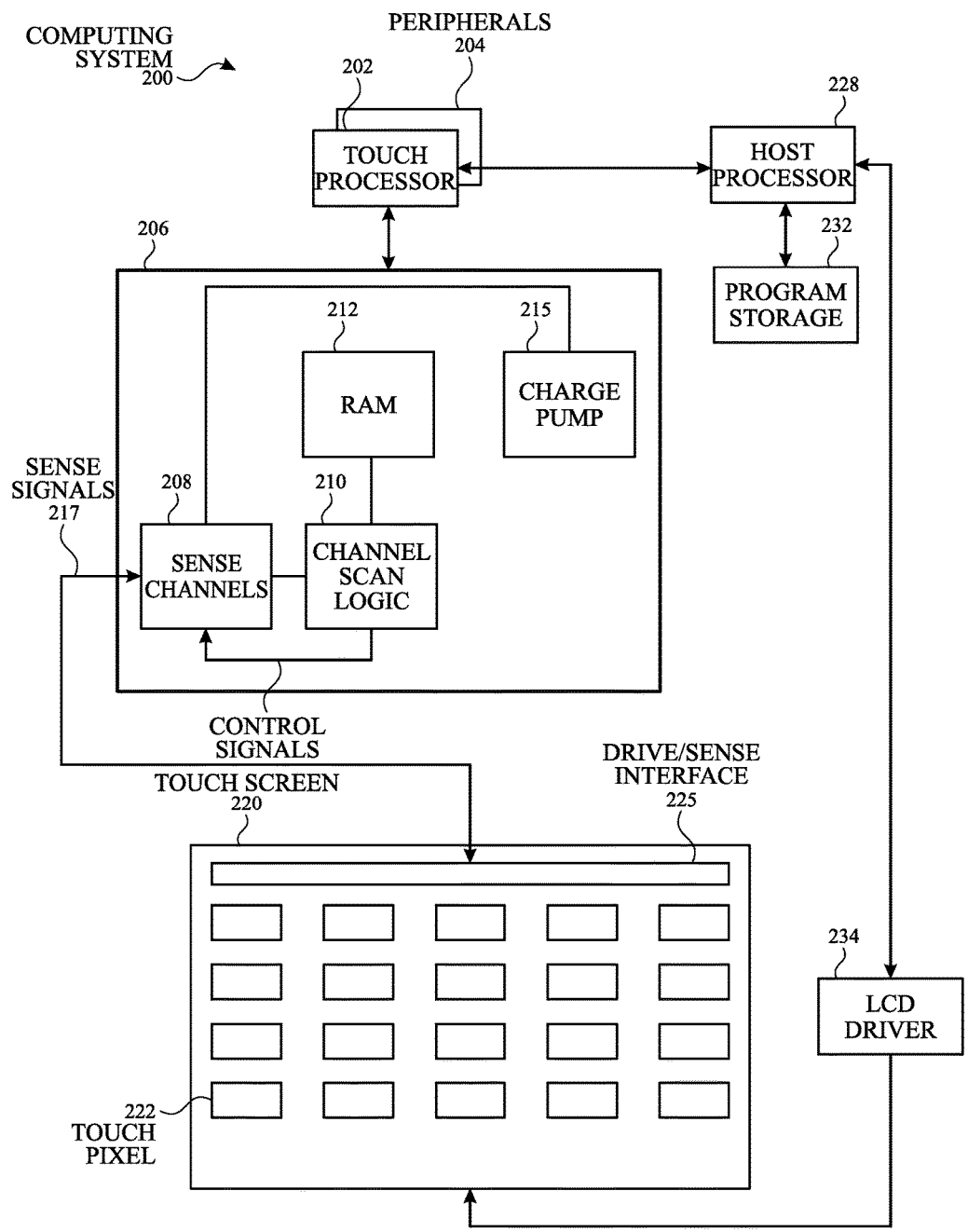
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of touch pixels 222 (e.g., a pixelated self-capacitance touch screen). Touch pixels 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixels 222) as "touch pixels" can be particularly useful when touch screen 220 is viewed as capturing an "image" of touch. In other words, after touch controller 206 has determined an amount of touch detected at each touch pixel 222 in touch screen 220, the pattern of touch pixels in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
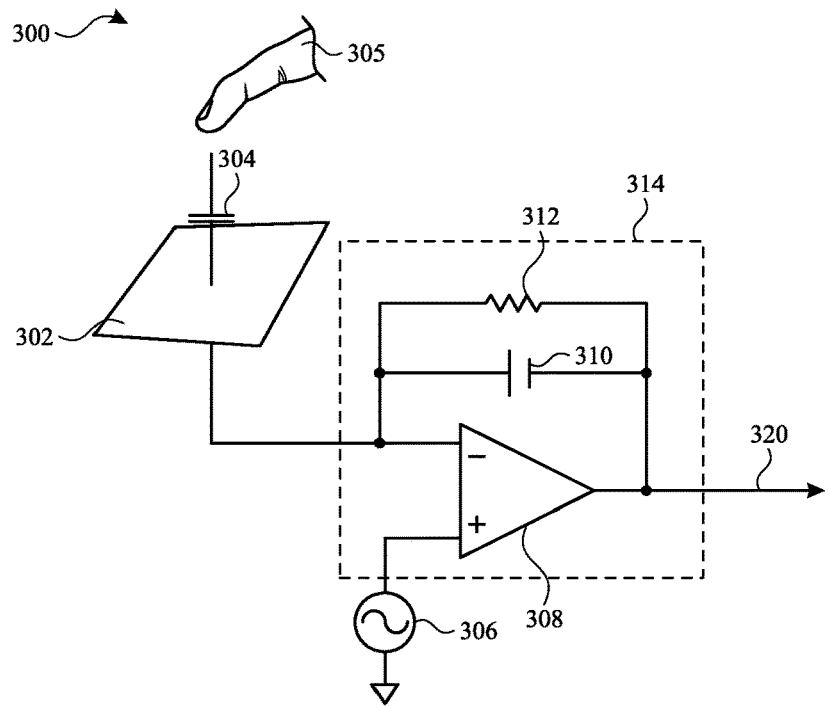
FIG. 3A illustrates an exemplary touch sensor circuit corresponding to a self-capacitance touch pixel electrode and sensing circuit according to examples of the disclosure.

FIG. 3A illustrates an exemplary touch sensor circuit 300 corresponding to a self-capacitance touch pixel electrode 302 and sensing circuit 314 according to examples of the disclosure. Touch pixel electrode 302 can correspond to touch pixel 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314 (which can correspond to sense channels 208). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor (e.g., touch controller 206) to determine the presence of a proximity or touch event, or the output can be inputted into a discrete logic network to determine the presence of a touch or proximity event. Touch sensor circuit 300 can represent the structure and/or operation of touch pixel sensing of the examples of the disclosure.

Figure 3B:
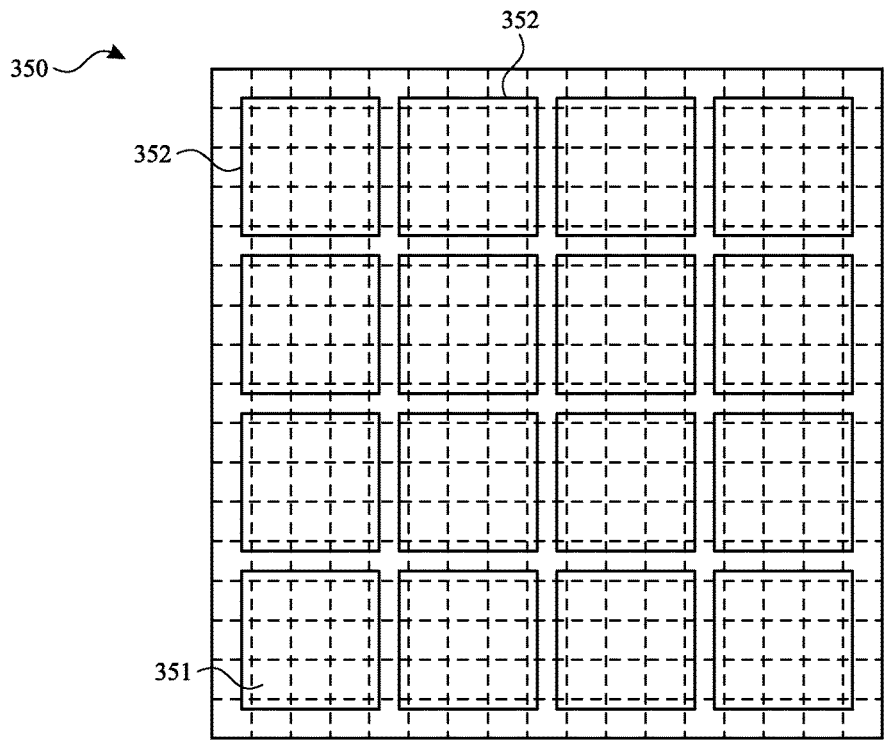
FIG. 3B illustrates an example configuration in which common electrodes can form portions of the touch sensing circuitry of a touch sensing system.

In some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., OLED displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3B illustrates an example configuration in which common electrodes 352 can form portions of the touch sensing circuitry of a touch sensing system—in some examples of this disclosure, the common electrodes can form touch pixels used to detect an image of touch on touch screen 350, as described above. Each common electrode 352 (i.e., touch pixel) can include a plurality of display pixels 351, and each display pixel 351 can include a portion of a common electrode 352, which can be a circuit element of the display system circuitry in the display pixel stackup (i.e., the stacked material layers forming the display pixels) of the display pixels of some types of LCD or other displays that can operate as part of the display system to display an image.

In the example shown in FIG. 3B, each common electrode 352 can serve as a multi-function circuit element that can operate as display circuitry of the display system of touch screen 350 and can also operate as touch sensing circuitry of the touch sensing system. In this example, each common electrode 352 can operate as a common electrode of the display circuitry of the touch screen 350, as described above, and can also operate as touch sensing circuitry of the touch screen. For example, a common electrode 352 can operate as a capacitive part of a touch pixel of the touch sensing circuitry during the touch sensing phase. Other circuit elements of touch screen 350 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel in an "off" state. Stimulation signals can be applied to common electrode 352. Changes in the total self-capacitance of common electrode 352 can be sensed through an operational amplifier, as previously discussed. The change in the total self-capacitance of common electrode 352 can depend on the proximity of a touch object, such as a finger, to the common electrode. In this way, the measured change in total self-capacitance of common electrode 352 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multifunction circuit element in other examples, and vice versa.

The common electrodes 352 (i.e., touch pixels) and display pixels 351 of FIG. 3B are shown as rectangular or square regions on touch screen 350. However, it is understood that the common electrodes 352 and display pixels 351 are not limited to the shapes, orientations, and positions shown, but can include any suitable configurations according to examples of the disclosure.

While the discussion in this disclosure focuses on touch screens, it is understood that some or all of the examples of the disclosure can similarly be implemented in a touch sensor panel (i.e., a panel having touch sensing circuitry without display circuitry). For brevity, however, the examples of the disclosure have been, and will be, described in the context of a touch screen.

As described above, the self-capacitance of each touch pixel (e.g., touch pixel 222) in the touch screen of the disclosure can be sensed to capture an image of touch across the touch screen. To allow for the sensing of the self-capacitance of individual touch pixels, it can be necessary to route one or more electrical connections between each of the touch pixels and the touch sensing circuitry (e.g., sense channels 208) of the touch screen. It should be noted that although the examples of the disclosure are presented in the context of connecting touch pixels to sense channels, it is understood that the techniques described can be utilized in other contexts involving connections to touch screen components (e.g., connecting mutual capacitance drive lines to drive circuitry).

Figure 4:
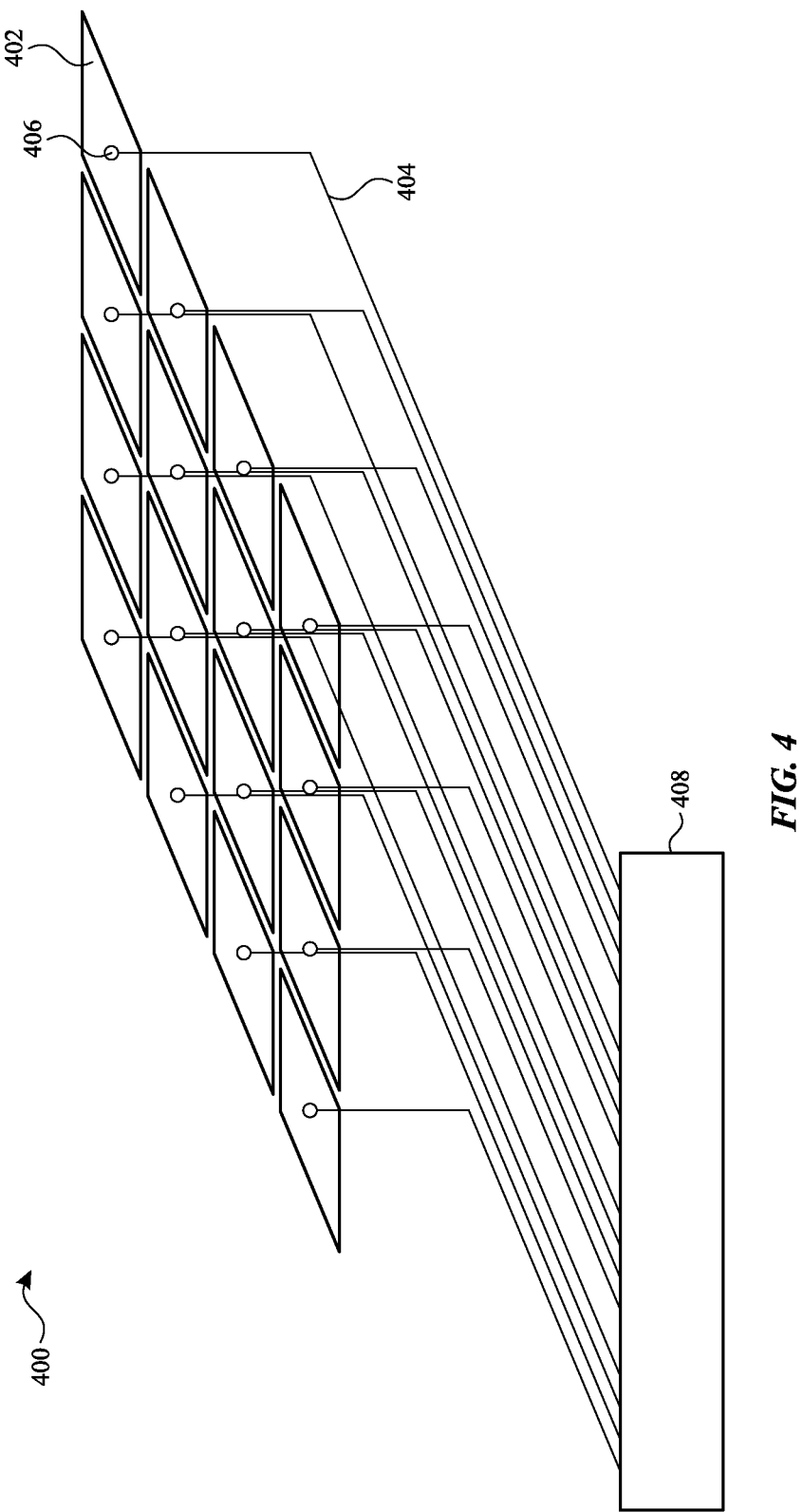
FIG. 4 illustrates an exemplary configuration for electrically connecting touch pixels in a touch screen to sense channels according to examples of the disclosure.

FIG. 4 illustrates an exemplary configuration for electrically connecting touch pixels 402 in touch screen 400 to sense channels 408 according to examples of the disclosure. In some examples, sense channels 408 can be located in a touch controller separate from the touch screen, but in some examples, the sense channels can be located on the touch screen. Touch screen 400 can include touch pixels 402, as described above. Components of touch screen 400 other than touch pixels 402 are not illustrated for ease of description. Each of touch pixels 402 can be electrically connected to sense channels 408 through sense connections 404 and connection points 406. In some examples, sense connections 404 can connect touch pixels 402 to a location on the touch screen (e.g., bond pads or a flex circuit connection area) from which a separate connection (e.g., a flex circuit) can complete the connection to sense channels 408 (e.g., when the sense channels are located separate from touch screen 400). In some examples, sense connections 404 can connect touch pixels 402 directly to sense channels 408 (e.g., when the sense channels are located on touch screen 400). In some examples, connection points 406 can be vias when sense connections 404 and touch pixels 402 reside in different layers of touch screen 400 (e.g., when the sense connections reside underneath the touch pixels, or when the sense connections reside on top of the touch pixels). In such examples, connection points 406 can allow for an electrical connection between touch pixels 402 and sense connections 404 through one or more intervening layers that may exist between the touch pixels and the sense connections in touch screen 400. It is understood that in some examples, sense connections 404 and touch pixels 402 can reside in the same layer of touch screen 400 (e.g., in the same ITO layer), and connection points 406 can simply represent the electrical coupling of the sense connections and the touch pixels.

Figure 5:
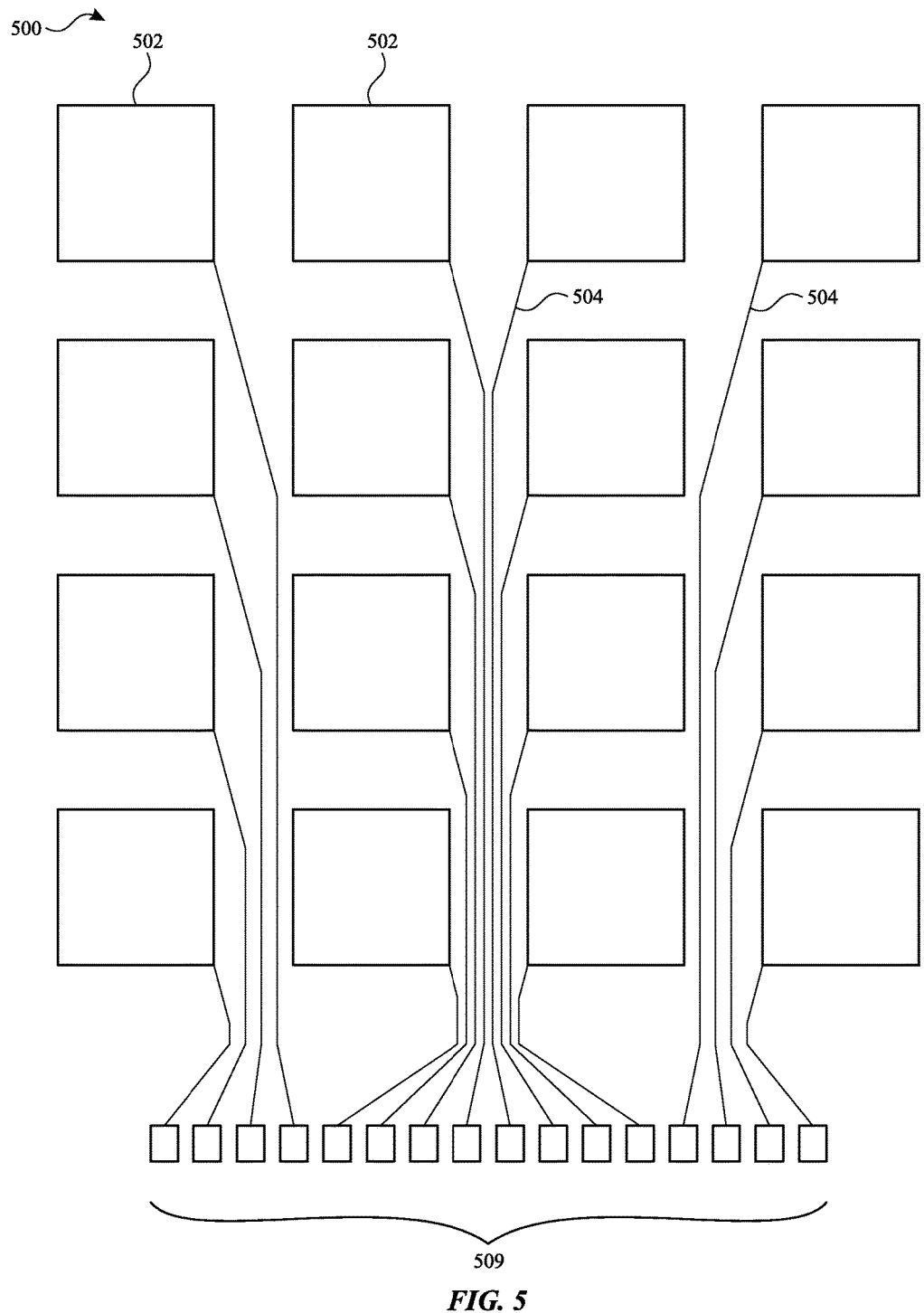
FIG. 5 illustrates an exemplary touch screen routing configuration in which sense connections can be in the same layer of the touch screen as touch pixels according to examples of the disclosure.

FIG. 5 illustrates an exemplary touch screen 500 routing configuration in which sense connections 504 can be in the same layer of the touch screen as touch pixels 502 according to examples of the disclosure. FIG. 5 can illustrate touch screen 500 having 16 touch pixels 502, though it is understood that aspects of the examples described herein can similarly extend to touch screens with more or less than 16 touch pixels. Touch pixels 502 and sense connections 504 can be formed of the same process layer (e.g., the same ITO layer).

Touch pixels 502 can be electrically coupled to bond pads 509 by sense connections 504. Bond pads 509 can facilitate electrical coupling between touch pixels 502/sense connections 504 and any other touch screen component—for example, sense channels (not illustrated). In some examples, bond pads 509 can be formed of the same process layer as touch pixels 502 and/or sense connections 504. In some examples, sense connections 504 can be disposed between columns of touch pixels 502, as illustrated. In some examples, the sense connections 504 disposed between adjacent columns of touch pixels 502 can be coupled to one or more touch pixels in both of the adjacent columns of touch pixels. In some examples, some of the sense connections 504 can be routed along the outside of the touch pixels 502/touch screen 502, instead of between adjacent columns of touch pixels. In some examples, all of the sense connections 504 disposed between adjacent columns of touch pixels 502 can be coupled to touch pixels in only one of the adjacent columns of touch pixels. Other sense connection 504 and touch pixel 502 coupling configurations are also contemplated, and the examples of the disclosure can similarly be extended to cover such coupling configurations as well. In some examples, sense connections 504 can be disposed in an active area of touch screen 500 or touch sensor panel (i.e., an area of the touch screen/touch sensor panel in which a display associated with the touch screen/touch sensor panel displays an image).

In some examples, the layout of sense connections 504 and bond pads 509 on touch screen 500 can affect touch sensing operation of the touch screen by causing false touch signals to be registered on the touch screen, as will be described in more detail below. It can be beneficial to correct for such false touch signals to increase touch screen accuracy. The discussion that follows explains some mechanisms by which false touch signals can be registered on touch screen 500, and provides some techniques for correcting for such false touch signals.

Figure 6:
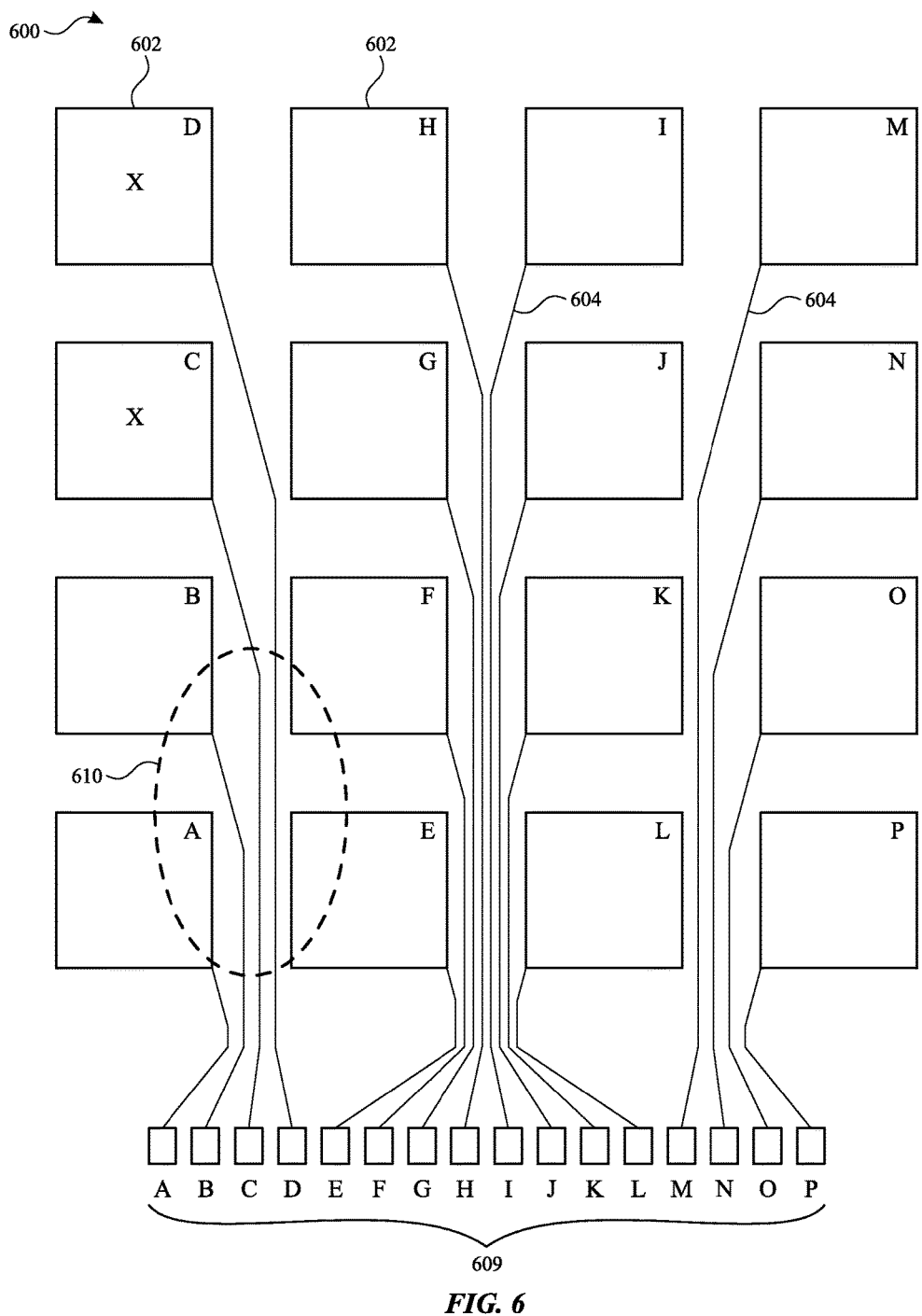
FIG. 6 illustrates an exemplary touch detected on a touch screen according to examples of the disclosure.

FIG. 6 illustrates an exemplary touch 610 detected on touch screen 600 according to examples of the disclosure. Touch screen 600 can correspond to touch screen 500 in FIG. 5. Touch 610 can be positioned partially over touch pixels 602 A, B, E and F, as illustrated. Touch 610 can correspond to a finger or other object touching or in proximity to touch screen 600.

Touch 610 can be sensed by touch pixels 602 A, B, E and F. Each of touch pixels 602 A, B, E and F can sense varying amounts of touch due to touch 610. In other words, touch 610 can couple to touch pixels 602 A, B, E and F, and can cause varying degrees of change in the self-capacitances of each of the touch pixels A, B, E and F—these changes can be detected by touch sensing circuity (not illustrated) to determine various characteristics of the touch, such as position, magnitude, shape, etc. In some examples, a "count" can refer to a dimensionless unit of touch, and the number of "counts" that a touch pixel 602 can sense can range from 0 counts (no touch detected) to 1000 counts (full touch detected). Referring to FIG. 6, touch pixel 602 A can sense, for example, 350 counts; touch pixel B can sense, for example, 250 counts; touch pixel E can sense, for example, 400 counts; and, touch pixel F can sense, for example, 300 counts. Based on the counts sensed by touch pixels 602 A, B, E and F, a touch controller (e.g., touch controller 206) and/or a touch processor (e.g., touch processor 202) can determine an "image" of touch on touch screen 600. It is understood that the counts provided above are exemplary only, and do not limit the scope of the disclosure.

In some examples, touch 610 can overlap one or more sense connections 604, as illustrated. Further, in some examples, sense connections 604 can be in the same layer of touch screen 600 (e.g., in the same process/material layer, such as ITO) as touch pixels 602. Also, in some examples, sense connections 604 may be shielded, but only partially shielded such that some fraction of the touch capacitance can couple into the sense connections. Thus, touch 610 can couple to sense connections 604 in addition to coupling to touch pixels 602. This, in turn, can result in a touch controller and/or a touch processor identifying small amounts of false touch as having been detected at touch pixels 602 to which sense connections 604 are coupled, because the touch controller and/or the touch processor may not be able to discern between touch sensed on a touch pixel and touch sensed on a sense connection. For example, in FIG. 6, touch 610 can "inject" false counts (i.e., touch signals) into touch pixels 602 C and D (designated by an "X"), because the touch can overlap and couple to sense connections 604 that are coupled to touch pixels C and D. These false counts can cause inaccuracies in touch screen 600 operation, such as in determining the position (centroid) of touch 610 on the touch screen, determining the shape of the touch, determining the number of touches on the touch screen, etc. In some cases where coupling is high, additional false touches or hovers may be created at touch pixels 602 C or D. Also, touches in the neighborhood of touch pixels 602 C and D may be inaccurate in position or shape due to the false counts added by coupling from sense connections 604 under touch 610.

Figure 7:
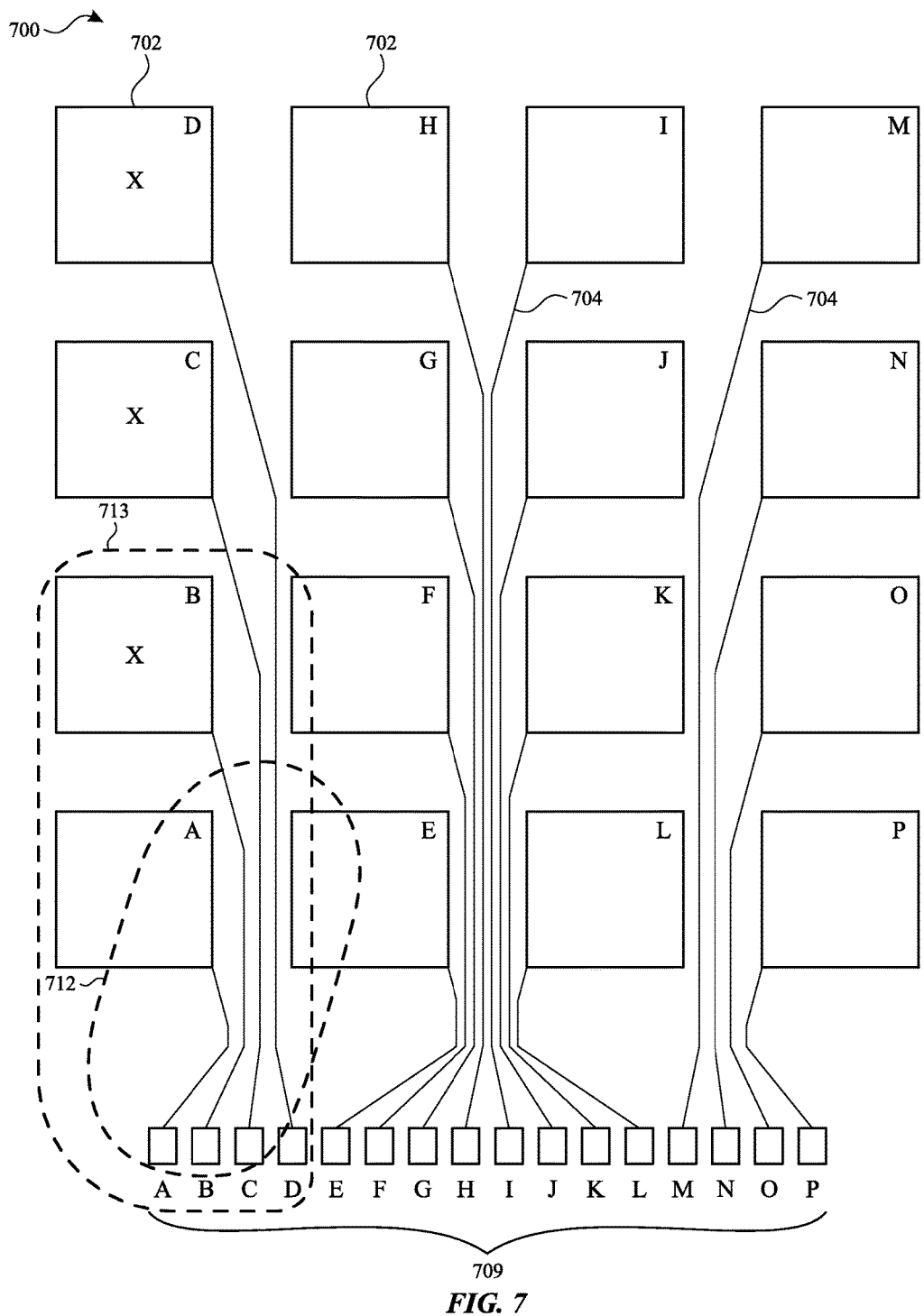
FIG. 7 illustrates another exemplary touch detected on a touch screen according to examples of the disclosure.

FIG. 7 illustrates another exemplary touch 712 detected on touch screen 700 according to examples of the disclosure. Touch screen 700 can correspond to touch screen 500 in FIG. 5 and touch screen 600 in FIG. 6. Touch 712 can be positioned partially over touch pixels 702 A and E, as illustrated. Touch 712 can also be positioned over bond pads 709 A, B and C. Touch 712 can correspond to a finger or other object touching or in proximity to touch screen 700.

Touch pixels 702 A and E can sense certain levels of counts resulting from touch 712 overlapping touch pixels A and E. For example, touch pixel 702 A can sense 400 counts of touch, and touch pixel E can sense 550 counts of touch. It is understood that the counts provided above are exemplary only, and do not limit the scope of the disclosure. Similar to above, touch 712 can also inject small amounts of false touch counts into touch pixels 702 B, C and D, because the touch can overlap and couple to sense connections 704 that are coupled to touch pixels B, C and D. Additionally, sense connections 704 in a border or outer region of touch screen 700 can be more closely disposed than sense connections between touch pixels 702, which in some examples can cause increased likelihood of false touch injection into a greater number of touch pixels.

In contrast to the example of FIG. 6, however, touch 712 can overlap bond pads 709 A, B and C. Bond pads 709 can have areas that can be more substantial than the areas of sense connections 704, and in some examples, can be in the same material/process layer as the sense connections and touch pixels 702. As a result, coupling of touch 712 with bond pads 709 can cause substantial injection of false touch counts into touch pixels 702 corresponding to the bond pads to which the touch couples. In the illustrated example, touch 712 can inject additional false touch counts into touch pixels 702 B, C and D due to the overlap of touch 712 with bond pads 709 A, B and C. These false counts can cause inaccuracies in touch screen 700 operation, such as in determining the position (centroid) of touch 712 on the touch screen, determining the shape of the touch, determining the number of touches on the touch screen, etc.—in some examples, the inaccuracy in FIG. 7 can be greater than the inaccuracy in FIG. 6, because bond pads 709 can cause greater false touch count injection than sense connections 704.

Figure 8:
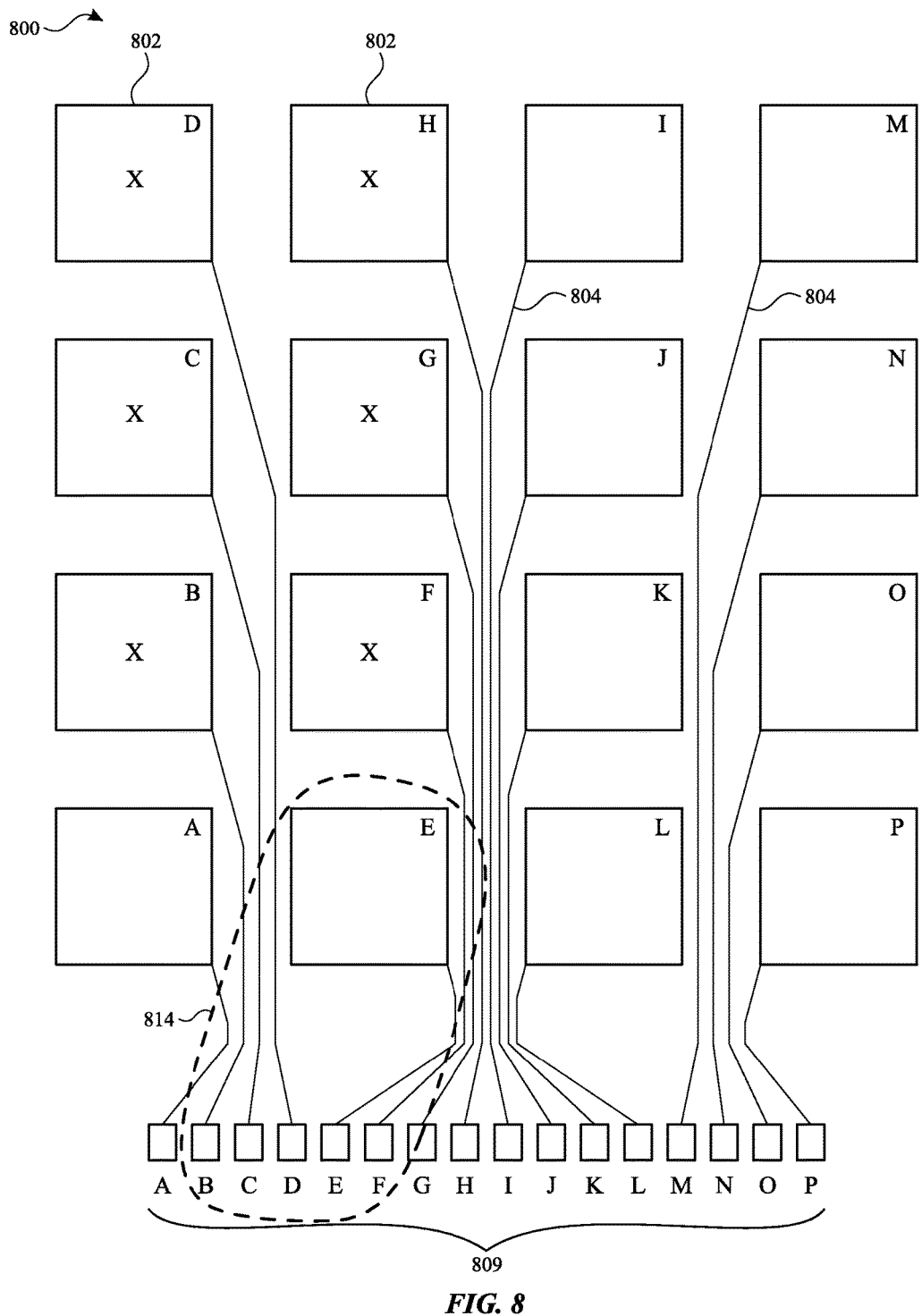
FIG. 8 illustrates another exemplary touch detected on a touch screen according to examples of the disclosure.

FIG. 8 illustrates another exemplary touch 814 detected on touch screen 800 according to examples of the disclosure. Touch screen 800 can correspond to touch screen 500 in FIG. 5, touch screen 600 in FIG. 6 and touch screen 700 in FIG. 7. Touch 814 can be positioned over touch pixel 802 E, as illustrated. Touch 814 can also be positioned over bond pads 809 B, C, D, E, F and G. Touch 814 can correspond to a finger or other object touching or in proximity to touch screen 800.

Touch pixel 802 E can sense a certain level of counts as a result of touch 814 overlapping touch pixel E. For example, touch pixel 802 E can sense 900 counts of touch. It is understood that the counts provided above are exemplary only, and do not limit the scope of the disclosure. Further, similar to above, touch 814 can also inject small amounts of false touch counts into touch pixels 802 B, C, D, F, G and H, because the touch can overlap and couple to sense connections 804 that are coupled to touch pixels B, C, D, F, G and H. Finally, touch 814 can inject additional false touch counts into touch pixels 802 B, C, D, E, F and G due to the overlap of touch 814 with bond pads 809 B, C, D, E, F and G. All together, these false counts can cause inaccuracies in touch screen 800 operation, such as in determining the position (centroid) of touch 814 on the touch screen, determining the shape of the touch, determining the number of touches on the touch screen, etc. In some cases where coupling is high, additional false touches or hovers may be created at touch pixels 802 C or D. Also, touches in the neighborhood of touch pixels 802 C and D may be inaccurate in position or shape due to the false counts added by coupling from sense connections 804 under touch 814. In some examples, the inaccuracy in FIG. 8 can be greater than the inaccuracy in FIG. 7, because the number of bond pads 809 that touch 814 overlaps can be greater than the number of bond pads 709 that touch 712 overlaps.

The false counts that can be injected into any of the touch pixels on any of touch screens 500, 600, 700 or 800 can be corrected for by subtracting an appropriate number of counts from those touch pixels. In some examples, a touch controller (e.g., touch controller 206) and/or a touch processor (e.g., touch processor 202) can perform the false touch count correction. In some examples, the number of counts to be subtracted from any touch pixel can be a function of an amount of touch detected on the touch screen and/or the position of the touch detected on the touch screen. Further, because the number of false counts injected into the touch pixels of a touch screen can be based on the layout of the touch screen (e.g., placement of touch pixels, placement of sense connections, placement of bond pads, etc.), the amount of correction required for the false counts can be determined based on the layout of the touch screen. These and other considerations will be discussed in more detail below.

For example, referring again to FIG. 7, a touch detected as illustrated (touch 712) may inject false touch counts into touch pixels 702 A, B, C and D due to the layout of sense connections 704 and bond pads 709. As a result, if a touch positioned similar to touch 712 is detected on touch screen 700, that touch may only require false touch count correction to be performed in touch pixels 702 A, B, C and D, and not in any of the remaining touch pixels. In some examples, the touch pixels over which the touch is actually detected (e.g., touch pixels 702 A and E) may be excluded from correction, because the false touch injected into those touch pixels may be insubstantial in comparison to the actual touch detected at those touch pixels (e.g., the error induced in centroid accuracy or touch shape parameters can fall within touch accuracy specifications for the product in question). In some examples, the degree and scope of required false count correction can be empirically determined by creating or simulating touch activity at numerous positions on the touch screen, determining the amount of false touch counts injected as a result of the touch activity at each position, and determining an appropriate count correction amount based on the false counts determined. A collection of count correction amounts can be stored in a memory and utilized by a touch controller (e.g., touch controller 206) and/or a touch processor (e.g., touch processor 202) to correct touch pixel counts when one or more touches are detected on the touch screen. It is understood that in some examples, false count correction can result in negative touch values for some touch pixels (i.e., overcompensation).

In some examples, the amount of false count correction can be based on the amount of touch detected on the touch screen. In such examples, the corrected touch count for each touch pixel can be expressed as:

$$\text{pixel}_{i,j\ corrected} = \text{pixel}_{i,j\ uncorrected} - C_{i,j,l,m} * \text{pixel}_{l,m} \quad (1)$$

where $\text{pixel}_{i,j\ corrected}$ can represent the corrected touch count for a touch pixel at position i,j on the touch screen, $\text{pixel}_{i,j\ uncorrected}$ can represent the uncorrected touch count for a touch pixel (e.g., the touch count including the injected false counts from sense connections and/or bond pads), $C_{i,j,l,m}$ can represent a correction factor for the touch pixel at position i,j on the touch screen, and $\text{pixel}_{l,m}$ can represent the touch count detected at a touch pixel at position l,m on the touch screen (e.g., a touch pixel at which the "actual touch" is detected). As stated above, in some examples, $C_{i,j,l,m}$ can be determined empirically to provide sufficiently accurate false touch count correction at various positions on the touch screen. In other examples, the empirically determined $C_{i,j,l,m}$ can be provided as an initial approximation, and the final values of $C_{i,j,l,m}$ can be determined by minimizing the total error between the corrected pixel values and ideal pixel values over a large collection of possible touches at different positions and sizes. The ideal pixel values can be what the sensor would give in the absence of cross-coupling and can be either simulated or approximated by zeroing pixel counts a certain distance away from the touch.

For example, referring again to FIG. 7, touch 712 may cause 400 counts of touch to be detected at touch pixel 702 A. The corrected touch count for each of touch pixels 702 B, C and D can be expressed as:

$$\text{pixel}_{B\ corrected} = \text{pixel}_{B\ uncorrected} - C_{B,A} * (400\ \text{counts}) \quad (2)$$

$$\text{pixel}_{C\ corrected} = \text{pixel}_{C\ uncorrected} - C_{C,A} * (400\ \text{counts}) \quad (3)$$

$$\text{pixel}_{D\ corrected} = \text{pixel}_{D\ uncorrected} - C_{D,A} * (400\ \text{counts}) \quad (4)$$

In some examples, $C_{B,A}$, $C_{C,A}$ and $C_{D,A}$ (the correction factors for touch pixels 702 B, C and D, respectively) can be different; in some examples, $C_{B,A}$, $C_{C,A}$ and $C_{D,A}$ can be the same, or can be somehow related to each other. Any relation of $C_{B,A}$, $C_{C,A}$ and $C_{D,A}$ is contemplated and within the scope of the disclosure.

In some examples, false count correction may be initiated only after a specified threshold of touch has been detected on the touch screen so that unintentional or insubstantial touch activity detected on the touch screen may not trigger unnecessary false count correction. In some examples, this threshold can be 20% of a full touch (e.g., 200 counts, if a full touch is defined to be 1000 counts), though other thresholds can be utilized. In some examples, touch correction can continue until the touch activity falls below the specified threshold. Further, in some examples, false count correction may be initiated only after a specified threshold of touch has been detected at one or more specified positions on the touch screen.

For example, referring again to FIG. 7, false count correction may be initiated only after a specified threshold of touch has been detected at the row of touch pixels 702 that is adjacent to bond pads 709 (e.g., touch pixels A, E, L and P). The reason for this can be that false count correction may only need to occur when a touch overlaps one or more of bond pads 709, which may only be likely to occur when a specified amount of touch is detected at one or more of touch pixels 702 in the bottom row of touch pixels on touch screen 700. False count correction may not need to be performed when a touch overlaps merely sense connections 704 and/or touch pixels 702, without overlapping bond pads 709, because false counts caused by overlap of a touch with sense connections may not be substantial in magnitude/number. It is understood that the layout of touch screen 700 is exemplary only, and that other touch pixel 702, sense connection 704 and bond pad 709 layouts may require different false count correction trigger touch pixels to be defined.

In some examples, in addition to requiring more than a specified threshold of touch to be detected at one or more touch pixels 702 in the bottom row of touch pixels on touch screen 700, the second from the bottom row of touch pixels (touch pixels B, F, K and O) can be monitored to determine whether the touch detected on the bottom row of touch pixels (touch pixels A, E, L and P) is positioned more towards the second row, or more towards bond pads 709. If the touch is positioned more towards the second from the bottom row of touch pixels 702, false count correction may be forgone despite the specified touch threshold being detected at the bottom row of touch pixels, because the touch may not overlap with bond pads 709.

In some examples, each touch pixel may be associated with its own correction factor, and each touch pixel may be associated with its own touch pixels for which false count correction is to be performed. For example, referring again to FIG. 7, detection of touch 712 over a specified threshold at touch pixel 702 A may trigger false count correction at touch pixels A, B, C and D, because sense connections 704 and/or bond pads 709 associated with touch pixels A, B, C and D may be near touch pixel A, and thus may be likely to couple to an object touching or in proximity to touch pixel A. Similarly, detection of a touch over a specified threshold at touch pixel 702 E may trigger false count correction at touch pixels A, B, C, D, E, F, G and H, because sense connections 704 and/or bond pads 709 associated with those touch pixels may be near touch pixel E, and thus may be likely to couple to an object touching or in proximity to touch pixel E. As mentioned above, the amount of count correction and/or the touch pixels to be corrected for a given touch position can be determined empirically using any suitable optimization technique. The amount of count correction for each touch pixel can be given by equation (1), above.

If a touch or touches that exceed specified thresholds are detected at two or more touch pixels concurrently, false count correction associated with each touch pixel of the two or more touch pixels can be performed independently and cumulatively. For example, referring again to FIG. 7, suppose touch 713 covers touch pixels 702 A and B, sense connections 704 coupled to touch pixels A, B, C and D, and bond pads 709 A, B, C and D. If touch 713 exceeds a specified threshold for false count correction on touch pixel 702 A, and exceeds a specified threshold (sometimes, the same threshold) for false count correction on touch pixel B, false count correction can be performed on touch pixels B, C and D according to equation (1) with respect to touch pixel A, and then additional false count correction can be performed on touch pixels C and D according to equation (1) with respect to touch pixel B. The false count correction factor ($C_{i,j,l,m}$) can differ for touch pixel A and touch pixel B. For example, each of touch pixels 702 B, C and D can be corrected for false touch counts due to touch 713 on touch pixel A using:

$$pixel_{B\ corrected} = pixel_{B\ uncorrected} - C_{B\text{-}pixel\ A} * pixel_A \quad (5)$$

$$pixel_{C\ corrected} = pixel_{C\ uncorrected} - C_{C\text{-}pixel\ A} * pixel_A \quad (6)$$

$$pixel_{D\ corrected} = pixel_{D\ uncorrected} - C_{D\text{-}pixel\ A} * pixel_A \quad (7)$$

In addition to the corrections performed in equations (5)-(7), each of touch pixels 702 C and D can also be corrected for false touch counts due to touch 713 on touch pixel B using:

$$pixel_{C\ corrected} = pixel_{C\ uncorrected} - C_{C\text{-}pixel\ A} * pixel_A - C_{C\text{-}pixel\ B} * pixel_B \quad (8)$$

$$pixel_{D\ corrected} = pixel_{D\ uncorrected} - C_{D\text{-}pixel\ A} * pixel_A - C_{D\text{-}pixel\ B} * pixel_B \quad (9)$$

Multiple corrections of a single touch pixel can be added together to get a total false count correction for that single touch pixel.

Figure 9:
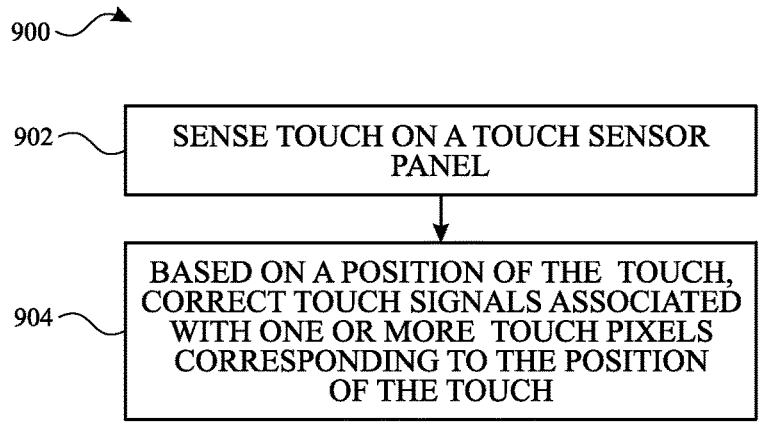
FIG. 9 illustrates an exemplary false count correction process according to examples of the disclosure.

FIG. 9 illustrates an exemplary false count correction process 900 according to examples of the disclosure. At 902, a touch can be sensed on a touch screen (e.g., touch screen 500) or touch sensor panel. The touch can be sensed at a certain position on the touch screen. For example, touch 712 can be sensed on touch screen 700. At 904, based on the position of the touch, touch signals associated with one or more touch pixels corresponding to the position of the touch can be corrected for false touch counts. For example, touch signals associated with touch pixels 702 B, C and D can be corrected for false touch counts based on the position of touch 712 on touch screen 700. It is understood that one or more of the features of the examples discussed above with reference to FIGS. 6-8 can be implemented as part of false count correction process 900.

Figure 10:
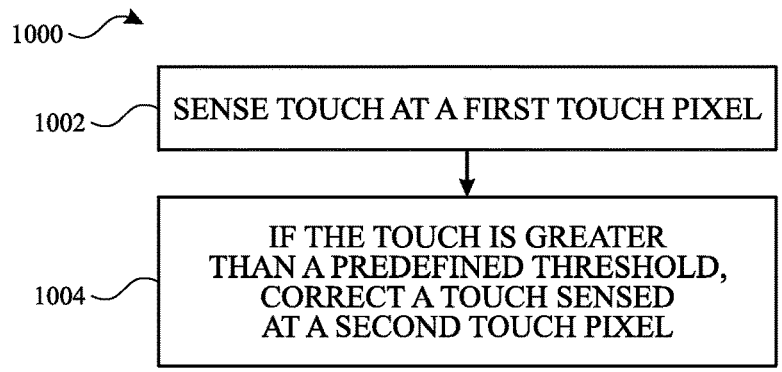
FIG. 10 illustrates another exemplary false count correction process according to examples of the disclosure.

FIG. 10 illustrates another exemplary false count correction process 1000 according to examples of the disclosure. At 1002, touch can be sensed at a first touch pixel on a touch screen (e.g., touch screen 500) or touch sensor panel. In some examples, the first touch pixel can be a specified touch pixel that can trigger false count correction, as discussed above. At 1004, if the sensed touch is greater than a predefined threshold, one or more touch signals sensed at a second touch pixel, different from the first touch pixel, can be corrected for false touch counts, as discussed above. In some examples, the amount of correction of touch at the second touch pixel can be based on the amount of touch detected at the first touch pixel. It is understood that one or more of the features of the examples discussed above with reference to FIGS. 6-8 can be implemented as part of false count correction process 1000.

Figure 11:
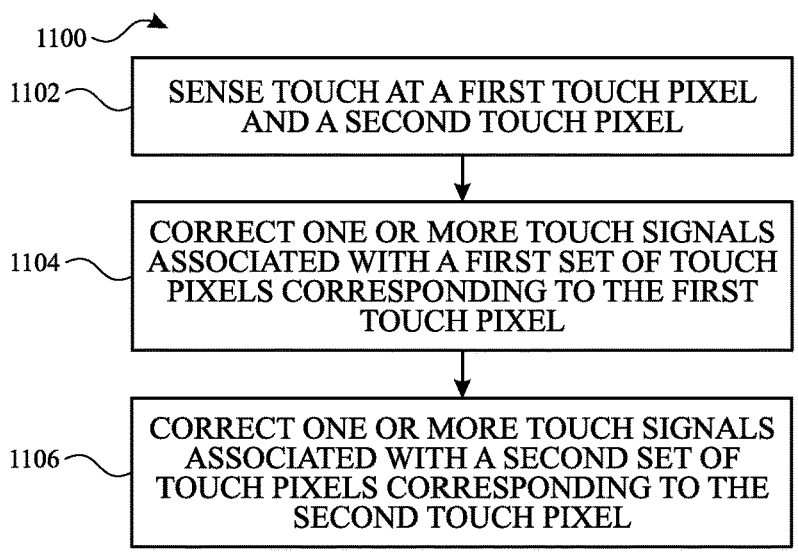
FIG. 11 illustrates another exemplary false count correction process according to examples of the disclosure.

FIG. 11 illustrates another exemplary false count correction process 1100 according to examples of the disclosure. At 1102, touch can be sensed at a first touch pixel and a second touch pixel on a touch screen (e.g., touch screen 500) or touch sensor panel. For example, touch 712 can be sensed at touch pixel 702 A and touch pixel E. At 1104, one or more touch signals associated with a first set of touch pixels corresponding to the first touch pixel can be corrected for false touch counts. For example, touch pixels 702 B, C and D, which can correspond to touch pixel A, can be corrected for false touch counts. At 1106, one or more touch signals associated with a second set of touch pixels, different from the first set of touch pixels, corresponding to the second touch pixel can be corrected for false touch counts. For example, touch pixels 702 B, C, D, F, G and H, which can correspond to touch pixel E, can be corrected for false touch counts. It is understood that one or more of the features of the examples discussed above with reference to FIGS. 6-8 can be implemented as part of false count correction process 1100.

Figure 12:
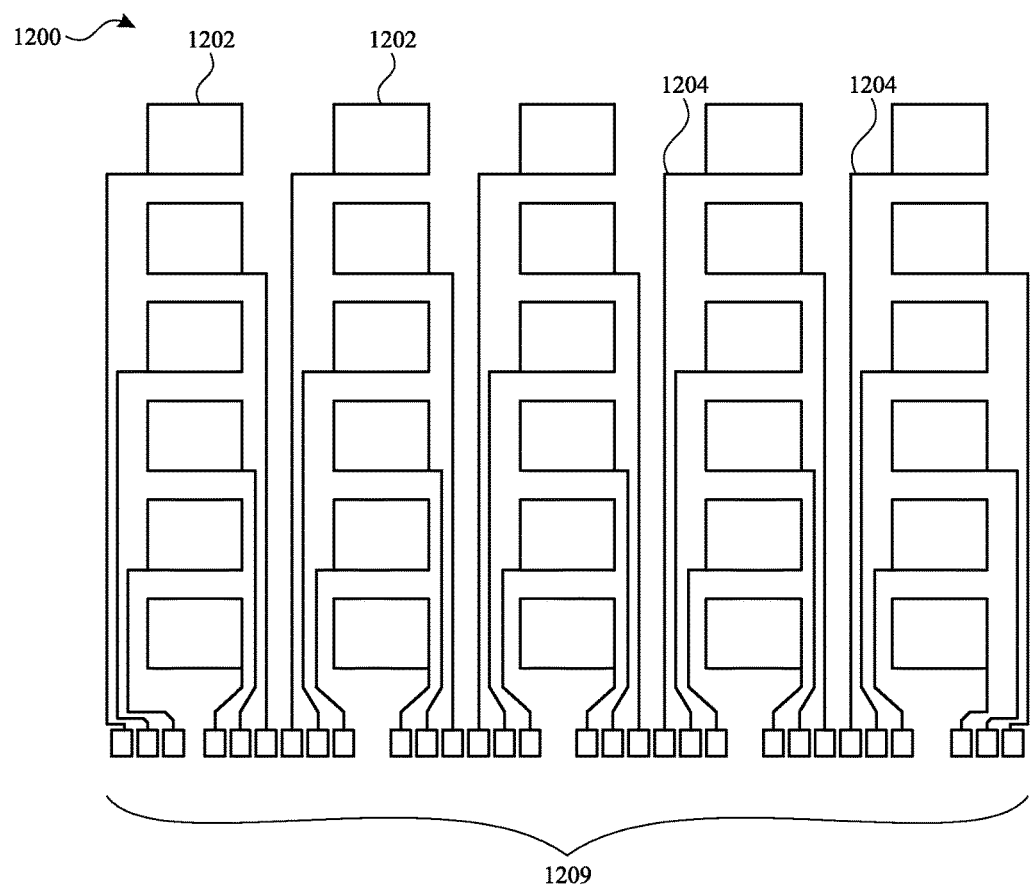
FIG. 12 illustrates another exemplary touch screen routing configuration according to examples of the disclosure.

It is understood that the examples of the disclosure can be implemented in many different touch screen routing configurations. FIG. 12 illustrates another exemplary touch screen 1200 routing configuration in which the examples of the disclosure can be practiced. Touch pixels 1202 can be coupled to sense connections 1204, and sense connections 1204 can be routed to bond pads 1209, as illustrated. One or more aspects of the examples disclosed above can similarly be implemented in the routing configuration of touch screen 1200.

Thus, the examples of the disclosure provide one or more techniques for correcting for false touch signals that may be injected into a touch screen.

Therefore, according to the above, some examples of the disclosure are directed to a touch screen comprising: a touch sensor panel including: a plurality of touch pixels, the plurality of touch pixels including a first touch pixel and a second touch pixel; a first sense connection coupled to the first touch pixel; and a second sense connection coupled to the second touch pixel; and a touch controller configured to: detect an object coupled to the first touch pixel and the second sense connection; and in response to detecting the object, output substantially no touch signal associated with the second touch pixel. Additionally or alternatively to one or more of the examples disclosed above, in some examples, the second sense connection is further coupled to a second bond pad, the object is further coupled to the second bond pad, and the touch controller is configured to: detect the object coupled to the first touch pixel, the second sense connection and the second bond pad, and in response to detecting the object, output substantially no touch signal associated with the second touch pixel. Additionally or alternatively to one or more of the examples disclosed above, in some examples, the touch controller is configured to: detect a first touch signal associated with the first touch pixel and the object; and output substantially no touch signal associated with the second touch pixel in response to the first touch signal exceeding a first predefined threshold. Additionally or alternatively to one or more of the examples disclosed above, in some examples, the touch controller is further configured to scale a first touch signal associated with the first touch pixel by a first correction coefficient corresponding to the first touch pixel and the second touch pixel, and subtract the scaled first touch signal from a second touch signal associated with the second touch pixel. Additionally or alternatively to one or more of the examples disclosed above, in some examples, the second sense connection is disposed adjacent to the first touch pixel on the touch screen. Additionally or alternatively to one or more of the examples disclosed above, in some examples, the second bond pad is disposed adjacent to the first touch pixel on the touch screen. Additionally or alternatively to one or more of the examples disclosed above, in some examples, the first touch pixel and the second touch pixel comprise self-capacitance touch pixels.

Some examples of the disclosure are directed to a touch controller comprising: sense circuitry configured to: detect a first touch signal at a first touch pixel on a touch sensor panel, and detect a second touch signal at a second touch pixel on the touch sensor panel; and a touch processor configured to, in response to the detection of the first touch signal at the first touch pixel, reduce the second touch signal based on the first touch signal. Additionally or alternatively to one or more of the examples disclosed above, in some examples, the touch processor is configured to reduce the second touch signal based on the first touch signal in response to the first touch signal exceeding a first predefined threshold. Additionally or alternatively to one or more of the examples disclosed above, in some examples, the sense circuitry is further configured to detect a third touch signal at a third touch pixel on the touch sensor panel, and the touch processor is further configured to, in response to the detection of the third touch signal at the third touch pixel, further reduce the second touch signal based on the third touch signal. Additionally or alternatively to one or more of the examples disclosed above, in some examples, reducing the second touch signal based on the first touch signal comprises: scaling the first touch signal by a first correction coefficient corresponding to the first touch pixel and the second touch pixel, and subtracting the scaled first touch signal from the second touch signal; and scaling the third touch signal by a second correction coefficient corresponding to the second touch pixel and the third touch pixel, different from the first correction coefficient, and subtracting the scaled third touch signal from the second touch signal. Additionally or alternatively to one or more of the examples disclosed above, in some examples, the sense circuitry is further configured to detect a third touch signal at a third touch pixel on the touch sensor panel, and the touch processor is further configured to, in response to the detection of the first touch signal at the first touch pixel, reduce the third touch signal based on the first touch signal. Additionally or alternatively to one or more of the examples disclosed above, in some examples, reducing the second touch signal based on the first touch signal comprises scaling the first touch signal by a first correction coefficient corresponding to the first touch pixel and the second touch pixel resulting a first scaled first touch signal, and subtracting the first scaled first touch signal from the second touch signal, and reducing the third touch signal based on the first touch signal comprises scaling the first touch signal by a second correction coefficient corresponding to the first touch pixel and the third touch pixel, different from the first correction coefficient, resulting in a second scaled first touch signal, and subtracting the second scaled first touch signal from the third touch signal. Additionally or alternatively to one or more of the examples disclosed above, in some examples, a second sense connection on the touch sensor panel is coupled to the second touch pixel and is configured to couple the second touch pixel to the sense circuitry, and the second sense connection is adjacent to the first touch pixel on the touch sensor panel. Additionally or alternatively to one or more of the examples disclosed above, in some examples, a second bond pad on the touch sensor panel is coupled to the second touch pixel and is configured to couple the second touch pixel to the sense circuitry, and the second bond pad is adjacent to the first touch pixel on the touch sensor panel. Additionally or alternatively to one or more of the examples disclosed above, in some examples, the first touch pixel and the second touch pixel comprise self-capacitance touch pixels. Additionally or alternatively to one or more of the examples disclosed above, in some examples, reducing the second touch signal based on the first touch signal comprises: scaling the first touch signal by a first correction coefficient corresponding to the second touch pixel; and subtracting the scaled first touch signal from the second touch signal.

Some examples of the disclosure are directed to a method comprising: providing a touch sensor panel including: a plurality of touch pixels, the plurality of touch pixels including a first touch pixel and a second touch pixel; a first sense connection coupled to the first touch pixel; and a second sense connection coupled to the second touch pixel; detecting an object coupled to the first touch pixel and the second sense connection; and in response to detecting the object, outputting substantially no touch signal associated with the second touch pixel. Additionally or alternatively to one or more of the examples disclosed above, in some examples, the second sense connection is further coupled to a second bond pad, the object is further coupled to the second bond pad, and the method further comprises: detecting the object coupled to the first touch pixel, the second sense connection and the second bond pad, and in response to detecting the object, outputting substantially no touch signal associated with the second touch pixel. Additionally or alternatively to one or more of the examples disclosed above, in some examples, the method further comprises: detecting a first touch signal associated with the first touch pixel and the object; and outputting substantially no touch signal associated with the second touch pixel in response to the first touch signal exceeding a first predefined threshold. Additionally or alternatively to one or more of the examples disclosed above, in some examples, the method further comprises: scaling a first touch signal associated with the first touch pixel by a first correction coefficient corresponding to the first touch pixel and the second touch pixel; and subtracting the scaled first touch signal from a second touch signal associated with the second touch pixel. Additionally or alternatively to one or more of the examples disclosed above, in some examples, the first touch pixel and the second touch pixel comprise self-capacitance touch pixels.

Some examples of the disclosure are directed to a method comprising: detecting a first touch signal at a first touch pixel on a touch sensor panel; detecting a second touch signal at a second touch pixel on the touch sensor panel; and in response to the detection of the first touch signal at the first touch pixel, reducing the second touch signal based on the first touch signal. Additionally or alternatively to one or more of the examples disclosed above, in some examples, reducing the second touch signal based on the first touch signal comprises: scaling the first touch signal by a first correction coefficient corresponding to the second touch pixel; and subtracting the scaled first touch signal from the second touch signal. Additionally or alternatively to one or more of the examples disclosed above, in some examples, reducing the second touch signal based on the first touch signal is in response to the first touch signal exceeding a first predefined threshold.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
a touch sensor panel including:
a plurality of touch pixel electrodes, the plurality of touch pixel electrodes including a first touch pixel electrode and a second touch pixel electrode;
a first sense connection coupled to the first touch pixel electrode; and
a second sense connection coupled to the second touch pixel electrode and
a touch controller configured to:
detect an object coupled to the first touch pixel electrode and the second sense connection resulting in a first amount of touch associated with the first touch pixel electrode and a second amount of touch associated with the second touch pixel electrode; and
in response to detecting the object:
in accordance with a determination that the first amount of touch associated with the first touch pixel electrode exceeds a touch threshold and independent of the second amount of touch associated with the second touch pixel electrode, apply a first touch correction to the second amount of touch associated with the second touch pixel electrode; and
in accordance with a determination that the first amount of touch associated with the first touch pixel electrode does not exceed the touch threshold, forgo applying the first touch correction to the second amount of touch associated with the second touch pixel electrode.

2. The touch screen of claim 1, wherein:
the second sense connection is further coupled to a second bond pad,
the object is further coupled to the second bond pad, and
the touch controller is configured to:
detect the object coupled to the first touch pixel electrode, the second sense connection and the second bond pad, and
in response to detecting the object, output substantially no touch signal associated with the second touch pixel electrode.

3. The touch screen of claim 1, wherein the touch controller is further configured to scale the first amount of touch associated with the first touch pixel electrode by a first correction coefficient corresponding to the first touch pixel electrode and the second touch pixel electrode, and subtract the scaled first amount of touch from the second amount of touch associated with the second touch pixel electrode.

4. The touch screen of claim 1, wherein the second sense connection is disposed adjacent to the first touch pixel electrode on the touch screen.

5. The touch screen of claim 2, wherein the second bond pad is disposed adjacent to the first touch pixel electrode on the touch screen.

6. The touch screen of claim 1, wherein the first touch pixel electrode and the second touch pixel electrode comprise self-capacitance touch pixel electrodes.

7. A touch controller comprising:
sense circuitry configured to:
detect a first touch signal at a first touch pixel on a touch sensor panel, and
detect a second touch signal at a second touch pixel on the touch sensor panel; and
a touch processor configured to, in response to the detection of the first touch signal at the first touch pixel:
in accordance with a determination that the first touch signal exceeds a threshold signal and independent of the second touch signal, reduce the second touch signal by an amount based on the first touch signal; and
in accordance with a determination that the first touch signal does not exceed the threshold signal, forgo reducing the second touch signal by the amount based on the first touch signal.

8. The touch controller of claim 7, wherein:
the sense circuitry is further configured to detect a third touch signal at a third touch pixel on the touch sensor panel, and
the touch processor is further configured to, in response to the detection of the third touch signal at the third touch pixel, further reduce the second touch signal based on the third touch signal.

9. The touch controller of claim 8, wherein reducing the second touch signal based on the first touch signal comprises:
scaling the first touch signal by a first correction coefficient corresponding to the first touch pixel and the second touch pixel, and subtracting the scaled first touch signal from the second touch signal; and
scaling the third touch signal by a second correction coefficient corresponding to the second touch pixel and the third touch pixel, different from the first correction coefficient, and subtracting the scaled third touch signal from the second touch signal.

10. The touch controller of claim 7, wherein:
the sense circuitry is further configured to detect a third touch signal at a third touch pixel on the touch sensor panel, and
the touch processor is further configured to, in response to the detection of the first touch signal at the first touch pixel, reduce the third touch signal based on the first touch signal.

11. The touch controller of claim 10, wherein:
reducing the second touch signal based on the first touch signal comprises scaling the first touch signal by a first correction coefficient corresponding to the first touch pixel and the second touch pixel resulting a first scaled first touch signal, and subtracting the first scaled first touch signal from the second touch signal, and
reducing the third touch signal based on the first touch signal comprises scaling the first touch signal by a second correction coefficient corresponding to the first touch pixel and the third touch pixel, different from the first correction coefficient, resulting in a second scaled first touch signal, and subtracting the second scaled first touch signal from the third touch signal.

12. The touch controller of claim 7, wherein:
a second sense connection on the touch sensor panel is coupled to the second touch pixel and is configured to couple the second touch pixel to the sense circuitry, and the second sense connection is adjacent to the first touch pixel on the touch sensor panel.

13. The touch controller of claim 7, wherein:
a second bond pad on the touch sensor panel is coupled to the second touch pixel and is configured to couple the second touch pixel to the sense circuitry, and
the second bond pad is adjacent to the first touch pixel on the touch sensor panel.

14. The touch controller of claim 7, wherein the first touch pixel and the second touch pixel comprise self-capacitance touch pixels.

15. The touch controller of claim 7, wherein reducing the second touch signal based on the first touch signal comprises:
scaling the first touch signal by a first correction coefficient corresponding to the second touch pixel; and
subtracting the scaled first touch signal from the second touch signal.

16. A method comprising:
detecting an object coupled to a first touch pixel electrode and a second sense connection of a touch sensor panel resulting in a first amount of touch associated with the first touch pixel electrode and a second amount of touch associated with a second touch pixel electrode, wherein the touch sensor panel includes:
a plurality of touch pixel electrodes including the first touch pixel electrode and the second touch pixel electrode;
a first sense connection coupled to the first touch pixel electrode; and
the second sense connection coupled to the second touch pixel electrode; and
in response to detecting the object:
in accordance with a determination that the first amount of touch associated with the first touch pixel electrode exceeds a touch threshold and independent of the second amount of touch associated with the second touch pixel electrode, applying a first touch correction to the second amount of touch associated with the second touch pixel electrode; and
in accordance with a determination that the first amount of touch associated with the first touch pixel electrode does not exceed the touch threshold, forgoing applying the first touch correction to the second amount of touch associated with the second touch pixel electrode.

17. The method of claim 16, wherein:
the second sense connection is further coupled to a second bond pad,
the object is further coupled to the second bond pad, and
the method further comprises:
detecting the object coupled to the first touch pixel electrode, the second sense connection and the second bond pad, and
in response to detecting the object, outputting substantially no touch signal associated with the second touch pixel electrode.

18. The method of claim 16, further comprising:
scaling a first touch signal associated with the first touch pixel electrode by a first correction coefficient corresponding to the first touch pixel electrode and the second touch pixel electrode; and
subtracting the scaled first touch signal from a second touch signal associated with the second touch pixel electrode.

19. The method of claim 16, wherein the first touch pixel electrode and the second touch pixel electrode comprise self-capacitance touch pixel electrodes.

20. A method comprising:
detecting a first touch signal at a first touch pixel on a touch sensor panel;
detecting a second touch signal at a second touch pixel on the touch sensor panel; and
in response to the detection of the first touch signal at the first touch pixel:
in accordance with a determination that the first touch signal exceeds a threshold signal and independent of the second touch signal, reducing the second touch signal by an amount based on the first touch signal;
in accordance with a determination that the first touch signal does not exceed the threshold signal, forgoing reducing the second touch signal by the amount based on the first touch signal.

21. The method of claim 20, wherein reducing the second touch signal based on the first touch signal comprises:
scaling the first touch signal by a first correction coefficient corresponding to the second touch pixel; and
subtracting the scaled first touch signal from the second touch signal.

* * * * *